Nov. 3, 1970  W. C. HYND  3,537,911
THERMAL PROTECTION FOR INSTRUMENTS
Filed Jan. 9, 1967
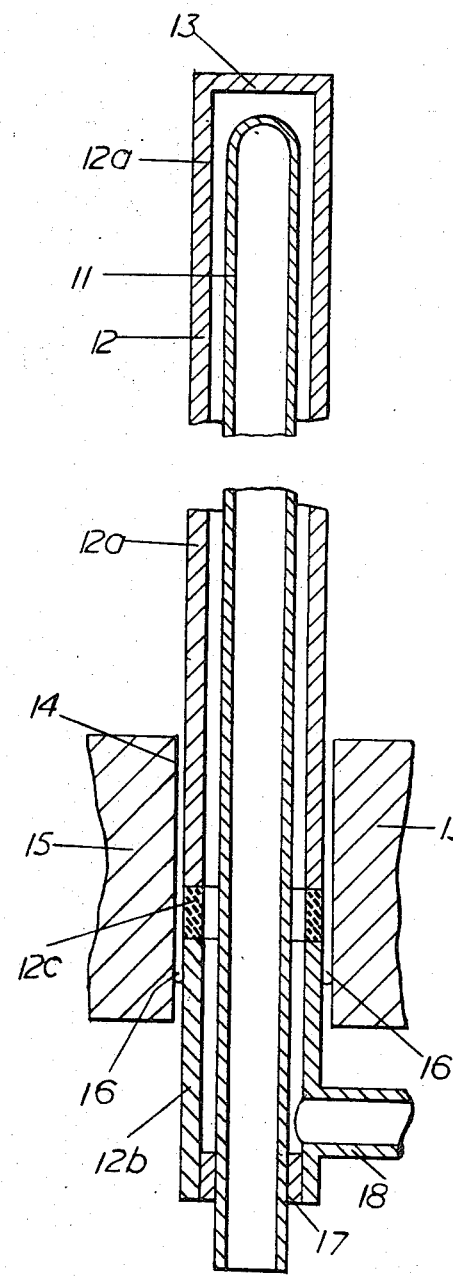
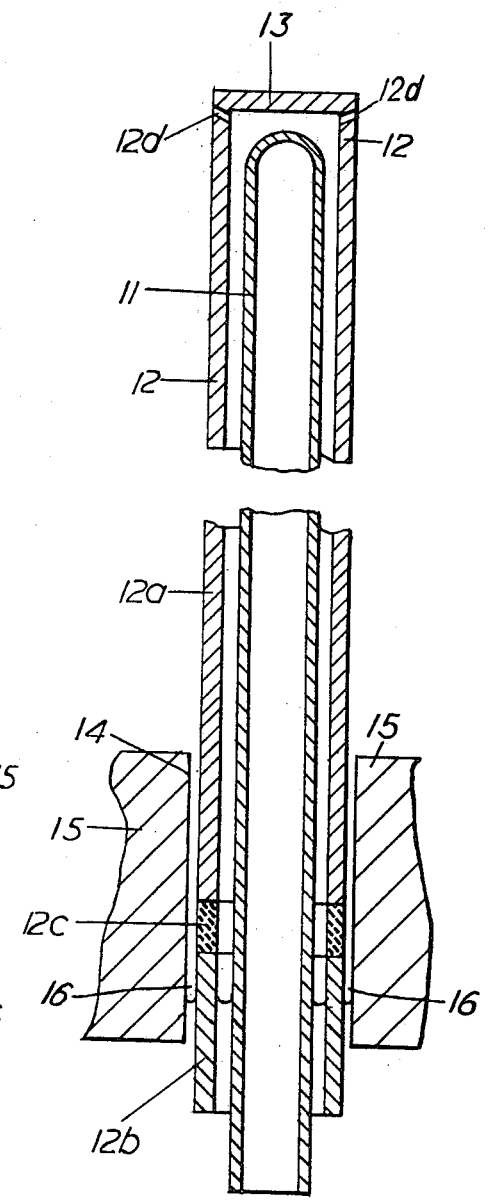
Inventor
William Christie Hynd.
By
Morrison, Kennedy & Campbell
Attorneys 3,537,911
THERMAL PROTECTION FOR INSTRUMENTS
William Christie Hynd, Liverpool, England, assignor to Pilkington Brothers Limited, Liverpool, England, a corporation of Great Britain
Filed Jan. 9, 1967, Ser. No. 608,029
Claims priority, application Great Britain, Jan. 18, 1966, 2,324/66
Int. Cl. H01v 1/00, 1/04
U.S. Cl. 136—242      7 Claims

ABSTRACT OF THE DISCLOSURE

A protective casing for an instrument, e.g., thermocouple, which is housed in a refractory tube, is a composite of a refractory part inert to molten material in which the instrument is immersed, and an oxidation resistant part for securing the casing in the container of the molten material.

---

This invention relates to the protection of instruments, e.g., thermocouples intended for use at high temperature, e.g., for measuring the temperature of molten glass.

It is known to insert an instrument, such as a thermocouple, into the molten glass in a glass tank for the purpose of measuring the glass temperature at specified points in the tank, and when a thermocouple is to be so used it is known to protect the instrument from the molten glass by surrounding the instrument with a refractory sheath.

When the protected instrument is inserted into the molten glass and has a relatively fixed position in the tank, the sheath can be broken due to thermal shock as it is inserted into the molten glass and when in position the sheath is attacked and scoured by the action of the glass flowing thereover, and the currents in the tank tend to bend the heat-softened assembly.

The life of an instrument and sheath assembly exposed to the molten glass is short, and in practice the useful life of an assembly at the melt end of a sheet glass tank is often much less than a week.

A main object of the persent invention is to provide a protection for an instrument to be introduced into a molten material at a high temperature, for example molten glass, against corrosion by the liquid and mechanical forces which would otherwise be exerted on the instrument by the liquid, and thereby to obtain a longer effective life for the instrument.

Apparatus for protecting instruments of the kind referred to, constructed according to the present invention, comprises a refractory tube closed at one end and of dimensions to house the instrument, and a casing for the tube, at least that part of the casing for location in the molten material being formed of material capable of maintaining rigidity and stability at the temperature of the molten material, so that the tube is shielded from wearing effects and mechanical forces derived from relative movement of the molten material with respect to the tube.

In a preferred embodiment of the invention the casing is coaxial with the refractory tube.

Further according to the invention the casing may be supported in spaced relation with the tube, and an isolating medium provided between the tube and the casing.

In one embodiment the space between the tube and the casing is sealed and means are provided for introducing an inert gas into the space between the tube and the casing so as to fill at least that part of the space which, in use, is surrounded by molten material, to isolate the tube from the casing.

In another embodiment the casing is formed with small apertures at the closed end to admit molten glass, so that substantially static molten glass can fill at least that part of the space which is surrounded by molten glass to isolate the tube from the casing.

Still further according to the invention that part of the casing for location in molten material may be formed of metal, e.g., molybdenum.

In order that the invention may be more clearly understood some embodiments thereof will now be described, by way of example, with reference to the accompanying diagrammatic drawings in which:

FIG. 1 shows in vertical section, apparatus for protecting a thermocouple to be used in measuring the temperature of molten glass, in which a tube adapted to house the theromocouple is located in a casing and the space between the tube and casing is filled with an inert gas, and FIG. 2 shows in vertical section, apparatus for protecting a thromocouple to be used in measuring the temperature of molten glass, in which a tube adapted to house the thermocouple is located in a casing and substantially static glass is interposed between the tube and the casing.

In the drawings like references designate similar parts.

In the arrangement shown in FIG. 1 of the drawings a refractory tube 11, closed at the upper end, is coaxially arranged within a cylindrical casing 12, the upper end of which casing 12 includes a flat end wall 13. The casing 12 passes upwardly through a circular passage 14 in a bottom refractory block 15 of a glass melting tank, and the bore of the passage 14 is of larger diameter than the maximum diameter of casing 12, so that when the casing 12 is located and correctly positioned within the tank, molten glass can flow down the space between casing 12 and the wall of the passage 14. As glass flows down this space it is flowing away from the heat source, i.e., the interior of the tank, and said glass is cooled by the refractory block 15, casing 12, and atmosphere, the lower regions of the passage 14 being exposed to atmosphere, so that the leading regions of the glass 16 solidify and form a seal which assists in retaining the casing 12 in position relative to the tank.

The space between the tube 11 and the casing 12 is sealed from atmosphere by an annular plug 17 and a pipe 18 connected to the casing 12 just above the annular plug 17 permits the space between tube 11 and casing 12 to be filled with an atmosphere inert with respect to the refractory tube 11 and the material of casing 12.

The casing 12 must be capable of withstanding the high temperature of the molten glass in the tank, for example temperature above 1,000° C. and must be quite stable to resist the flow of hot glass thereover, and conveniently at least that part of casing 12 exposed to the molten glass is formed of molybdenum.

If the whole of casing 12 were formed from molybdenum the lower regions of the casing 12, and more particularly those regions exposed to atmosphere, will be subjected to oxidation. To avoid this difficulty the casing 12 is formed in two parts, the upper part indicated at 12a being that portion of the casing 12 exposed to the effects of the hot glass and formed of molybdenum, and the lower regions indicated at 12b of the casing 12 being formed of stainless steel secured, by a brazed joint indicated at 12c to the molybdenum tube 12a. The pipe 18 is formed of stainless steel and is welded or brazed to tube 12 to effect a fluid tight connection therewith.

In operation the lower region 12b of the casing 12 is never exposed to the high temperatures of the glass tank, and therefore this portion remains quite stable, and, because the upper regions 12a of the casing 12 are formed of molybdenum and are always exposed to the molten glass or to the inert atmosphere in the space between casing 12 and tube 11, the upper regions of the tube 12 are also stable, and well able to resist the currents of hot glass flowing thereover. The tube 11 is thus protected against the flowing action of the molten glass by the casing 12 and therefore has only to withstand the high temperatures within the casing 12 so that a long life is to be expected.

During the insertion of the assembly of tube and casing into the glass tank the upper part 12a of the casing 12 is subjected to thermal shock by contact with the molten glass, and, because of the atmosphere surrounding tube 11, said tube 11 has its temperature elevated at a slower rate than would be experienced by direct immersion in the hot glass so that the thermal shock to the tube 11 is greatly reduced.

The open end of the tube 11 is exposed so that the thermocouple can be inserted into and removed from tube 11 as required without disturbing the tube 11 or casing 12 relative to the tank.

In the construction shown in FIG. 2 the bottom of the casing 12 is open and the casing 12 has small apertures 12d passing therethrough in the upper regions of said casing 12, to allow molten glass to flow into the space between tube 11 and casing 12 and to fill at least that part of the space which is surrounded by molten glass. The glass flows down the said space until the leading regions of the glass solidify and are exposed to atmosphere in the same manner as the glass flow allowed in the space between the casing 12 and the wall of passage 14, and thereby a seal is formed between the tube 11 and the casing 12. The tube 11 is thus separated from the casing 12, by molten glass and interaction between the tube 11 and casing 12 is avoided.

Glass flows into the space between the walls of the opening 14 and the casing 12 to seal the casing 12 to the tank in the manner hereinbefore described.

Since the only communication between the glass inside the casing 12 and the glass outside the casing 12, is by way of the small apertures 12d the glass within the casing 12 is substantially static and any tendency for glass flow between the apertures 12d is so slight as to be negligible. Because the glass in the space between tube 11 and casing 12 is substantially static, and does not flow, the tube 11 is not subjected to deformation by that glass, while the stable casing 12 is well able to resist deformation by the glass currents in the tank.

It will be seen that in the two above embodiments the tube 11 is exposed to a substantially stationary atmosphere within casing 12 and casing 12 withstands the forces exerted on the introduced assembly by the molten glass in the tank.

The regions of the casing 12 exposed to the molten glass in the tank are preferably formed of molybdenum but other materials capable of retaining the desired rigidity and stability may be used. When the tube 11 is formed from a refractory material such as recrystallised alumina, and the casing 12a is formed of molybdenum, and gas is circulated between said tube 11 and casing 12, as in FIG. 1, the gas is preferably oxygen free nitrogen.

In the constructions described with reference to the accompanying drawings the tube 11 is effectively isolated from the casing to prevent interaction between the dissimilar materials but one or the other or both of the dissimilar surfaces defining the space between tube 11 and casing 12 may be coated with a material which will allow other gases or liquids to be used, or the tube 11 and casing 12 may be in contact with each other if the materials from which they are made will not interact at the temperatures involved.

The tube 11 may be circular, oval, polygonal, or of other suitable cross section, to suit the particular instrument which it is to contain, and more than one tube 11, each housing an instrument, may be located in a single casing 12.

I claim:

1. Apparatus for protecting an instrument intended for use in measuring the temperature of molten material comprising a refractory tube closed at one end and of dimensions to house the instrument, a casing surrounding the tube, which casing is supported in spaced relation with the tube and comprises two contiguous parts, wherein the part of the casing intended for location in the molten material at one end envelopes said closed end of the tube and is formed of molybdenum, and the other part of the casing, which other part, in use, remains outside the molten material, is formed of an oxidation resistant metal, means sealing the space between the tube and the casing, and means for introducing an inert gas into said space so as to fill at least part of said space which, in use, is surrounded by molten material, to isolate the tube from the casing.

2. Apparatus for protecting an instrument intended for use in measuring the temperature of a molten material comprising a refractory tube closed at one end and of dimensions to house the instrument, and a casing surrounding the tube in spaced relation therewith, which casing comprises two contiguous parts, wherein the part of the casing intended for location in the molten material at one end envelopes said closed end of the tube and is formed of a metal inert to the molten material and capable of maintaining rigidity and stability at the temperature of the molten material, and the other part of the casing, which other part, in use, remains outside the molten material, is formed of an oxidation resistant material, and wherein the free end of the said part of the casing intended for location in the molten material is formed with small apertures to admit the molten material, so that substantially static molten material can fill at least that part of the space which is surrounded by the molten material, to isolate the tube from the casing.

3. Apparatus for protecting a thermocouple for measuring the temperature of molten glass, comprising a refractory tube closed at one end and of dimensions to house the thermocouple, and a casing surrounding the tube, which casing comprises two contiguous parts, wherein the part of the casing intended for location in the molten glass at one end envelopes said closed end of the tube and is formed of molybdenum, and the other part of the casing, which other part, in use, remains outside the molten glass, is formed of stainless steel.

4. Apparatus according to claim 3, wherein the casing is supported in spaced relation with the tube and wherein the apparatus includes means sealing the space between the tube and the casing, and means for introducing an inert gas into the space between the tube and the casing so as to fill at least that part of the space which, in use, is surrounded by molten material, to isolate the tube from the casing.

5. Apparatus according to claim 3, wherein the free end of the molybdenum part of the casing is formed with small apertures to admit molten glass, so that substantially static molten glass can fill at least that part of the space which is surrounded by molten glass, to isolate the tube from the casing.

6. Apparatus according to claim 3, in which the casing is coaxial with the refractory tube.

7. Apparaus according to claim 3, wherein said stainless steel part of said casing is brazed to one end of said molybdenum part of said casing.

References Cited

UNITED STATES PATENTS

| | | | |
|---|---|---|---|
| 2,579,271 | 12/1951 | Polye. | |
| 1,651,750 | 12/1927 | Brophy | 136—228 |
| 2,368,937 | 2/1945 | McGillin et al. | 136—233 X |
| 2,844,637 | 7/1958 | Borel et al. | 136—232 |
| 2,948,766 | 8/1960 | Schneider et al. | 136—232 |
| 3,011,006 | 11/1961 | Nicholson et al. | 136—234 X |
| 3,294,592 | 12/1966 | Fish et al. | 136—234 |

FOREIGN PATENTS

| | | |
|---|---|---|
| 1,057,575 | 10/1953 | France. |
| 478,603 | 1/1938 | Great Britain. |

OTHER REFERENCES

Kline, E. M., et al.: Metals and Alloys, vol. 21, pp. 401–403, 1945.

Bristol: Bristol's Electric Pyrometers, Catalog 1402, 1926, pp. 48 and 49.

Driesner, A. R., et al.: IRE Trans Nuc. Science, vol. NS9, 1962, pp. 247–252.

WINSTON A. DOUGLAS, Primary Examiner

M. J. ANDREWS, Assistant Examiner

U.S. Cl. X.R.

136—234